May 16, 1950          T. R. WELCH          2,507,744
VISUAL SIGNAL PROGRAM SYSTEM
Filed Sept. 3, 1946          5 Sheets-Sheet 3
FIG. 3
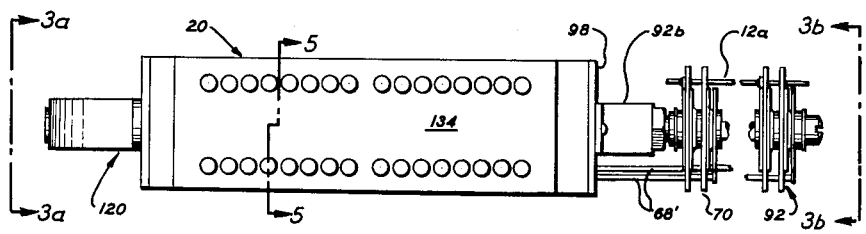
FIG. 4
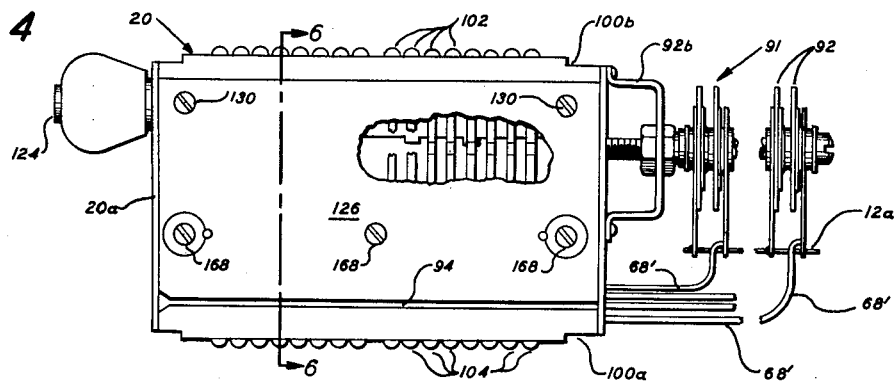
FIG. 3a    FIG. 3b    FIG. 5    FIG. 6
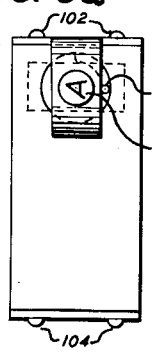 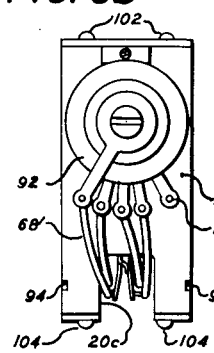 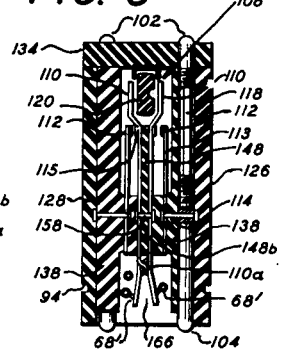 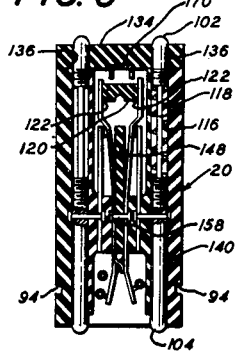
FIG. 7          FIG. 7a
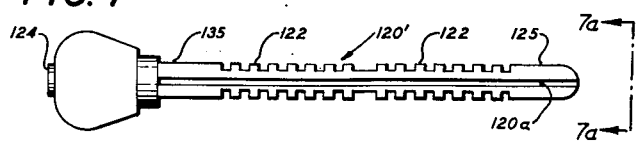 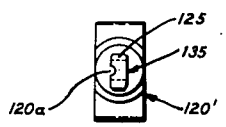
FIG. 8
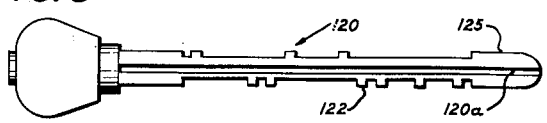
INVENTOR.
THOMAS ROSS WELCH
BY
ATTORNEY May 16, 1950  T. R. WELCH  2,507,744
VISUAL SIGNAL PROGRAM SYSTEM
Filed Sept. 3, 1946  5 Sheets-Sheet 4

INVENTOR.
THOMAS ROSS WELCH
BY
ATTORNEY

May 16, 1950     T. R. WELCH     2,507,744
VISUAL SIGNAL PROGRAM SYSTEM
Filed Sept. 3, 1946     5 Sheets—Sheet 5
FIG. 13
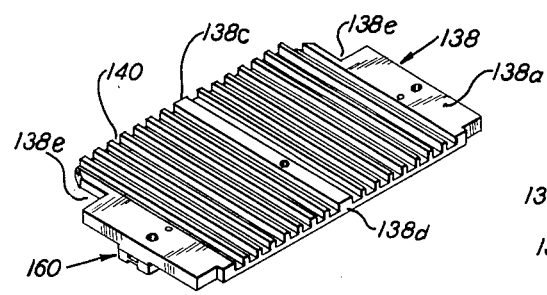
FIG. 14
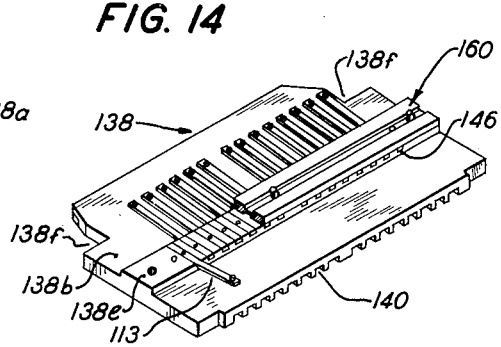
FIG. 15
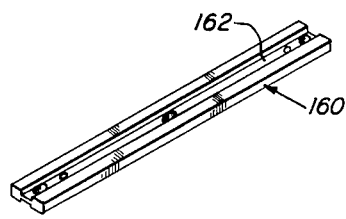
FIG. 16
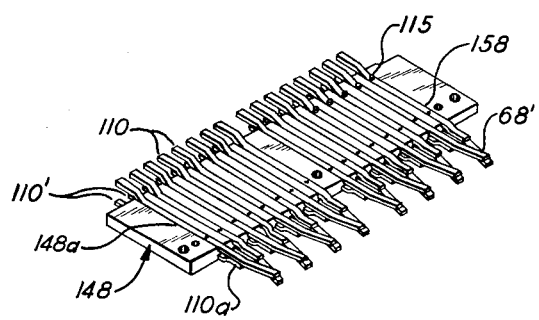
FIG. 17
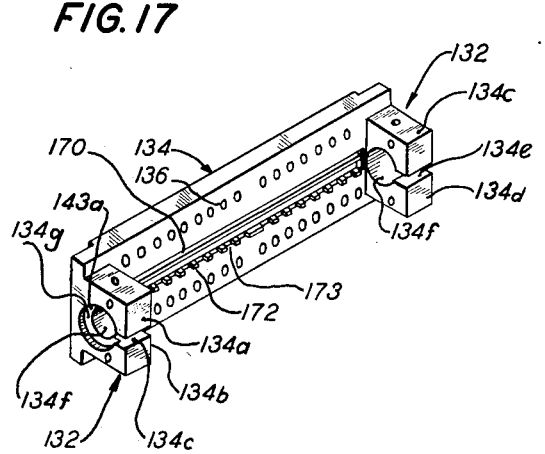
FIG. 18
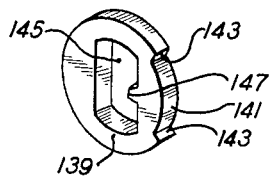
INVENTOR.
THOMAS ROSS WELCH
BY
ATTORNEY Patented May 16, 1950

2,507,744

UNITED STATES PATENT OFFICE 2,507,744

VISUAL SIGNAL PROGRAM SYSTEM

Thomas Ross Welch, Los Angeles, Calif.

Application September 3, 1946, Serial No. 694,664

5 Claims. (Cl. 177—346)

This invention relates to electric signaling systems such as form the subject matter of my copending application for United States Letters Patent on System of visual signal communication filed of even date herewith, and particularly to a signal program panel employed in such systems.

It is one of the objects of this invention to provide, in a system of the type referred to, for an extended program of signalled information and particularly to provide a program panel improved to occupy a minimum of space.

Another object of my invention is to provide in such a program panel for maximum facility of replacement, extension, and change of components.

Additional objects and advantages of my invention will appear in the following specification considered in connection with the accompany drawings, in which:

Fig. 3 is a plan view of a program panel unit;

Fig. 3a is a front view of the unit from line 3a—3a, of Fig. 3;

Fig. 3b is a rear view of the unit from line 3b—3b, of Fig. 3;

Fig. 4 is a side elevational view of the unit;

Fig. 5 is a section at line 5—5 of Fig. 3;

Fig. 6 is a section at line 6—6 of Fig. 4;

Fig. 7 is a side view of a detail;

Fig. 7a is an end view from line 7a—7a of Fig. 7;

Fig. 8 is a side view of the detail of Fig. 7 as developed for a particular use;

Fig. 13 is an isometric view of a further detail of the selector unit;

Fig. 14 is a similar view of the opposite side of the detail of Fig. 13;

Fig. 15 is an isometric view of a portion of the Fig. 14 detail;

Fig. 16 is an isometric view of the sub-assembly unit of the movable contacts;

Fig. 17 is an isometric view of the bridging top plate of the selector unit; and Fig. 18 is an isometric view of the selector orienting washer.

Figure 1:
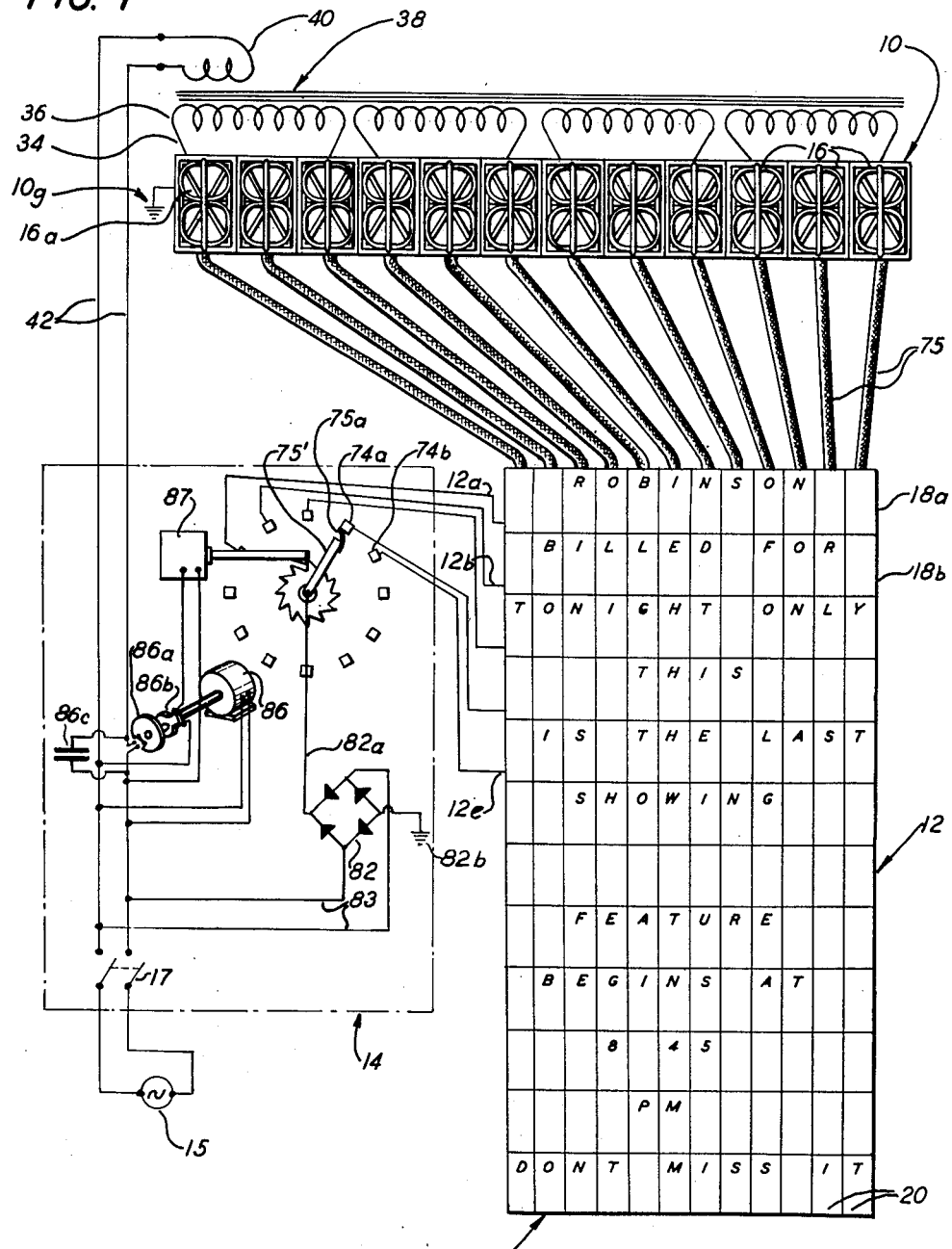
Fig. 1 is partially a wiring diagram and partially a schematic representation of a signaling system embodying my invention.

The signaling system will first be described in a general way with reference to Fig. 1 and then the signal program panel will be particularly described.

The signaling apparatus comprises the visual signal transmitting assembly 10 which is mounted on a building or the like exposed to view of the public; a signal symbol selector panel 12 by which a signal program is preselected; a circuit energizing apparatus as shown in the drawing area 14; symbol control cables 75; transformer primary energizing conductors 42; conductors 12a, 12b, etc., extending between apparatus 14, and the program panel 12; and a source of alternating current 15. The program panel 12 may be mounted in the manager's office of a theatre, and the apparatus 14 positioned in the control room. None of the apparatus forming program panel 12 is in motion during normal operation of the signal transmitter 10 and therefore produces no noise. Noise would be objectionable in the executive office of a theatre establishment.

The apparatus 14 comprises a bridge-connected dry disc rectifier 82 connected by conductors 83 to the power source 15 through line switch 17. Apparatus 14 further comprises a stepping switch arm 75 operated through a pawl and ratchet mechanism by a solenoid and plunger device 87. The direct current output of rectifier 82 is fed to arm 75' over a conductor 82a.

A contact 75a is, by operation of the ratcheting device, caused to contact sequentially a plurality of stationary contacts 74a, 74b, etc. At each such contact, current flows through the corresponding conductor 12a, 12b, etc., to energize certain relays of the group of electromagnetic relays 32, Fig. 2, for each of one or more of the symbols 16. In preferred apparatus the relays 32 are mounted on the support not shown of signal transmitting assembly 10 Fig. 1 and the current is caused to flow through the relay coils and to ground as at 10g (Fig. 1), whence it flows to a grounded terminal 82b of rectifier 82. Unidirectional current flow valves 92 Figs. 3 and 4 are included in the circuits of the conductors 12a, 12b to prevent reverse flow of current in these circuits under certain conditions of operation. The provision of the valves produces certain advantages pointed out in the copending application Serial No. 694,655, filed of even date herewith by Moses Allen, and assigned to myself.

A constant-speed-motor driven time switch device 86 (Fig. 1) energizes and deenergizes the solenoid 87 periodically through solenoid circuit switch contact 86b to cause stepping of the switch arm 75. A transformer 38 applies high voltage to the letter formers 16 during the period contact 75a, engages any one of the contacts 74a, 74b, etc. Energy at low alternating current voltage is applied to the transformer primary winding 40 over a pair of conductors 42 through a periodically operated switch 86a from source 15. A condenser 86c is provided across the contacts of switch 86a to prevent damage to the contacts due to arcing.

Figure 2:
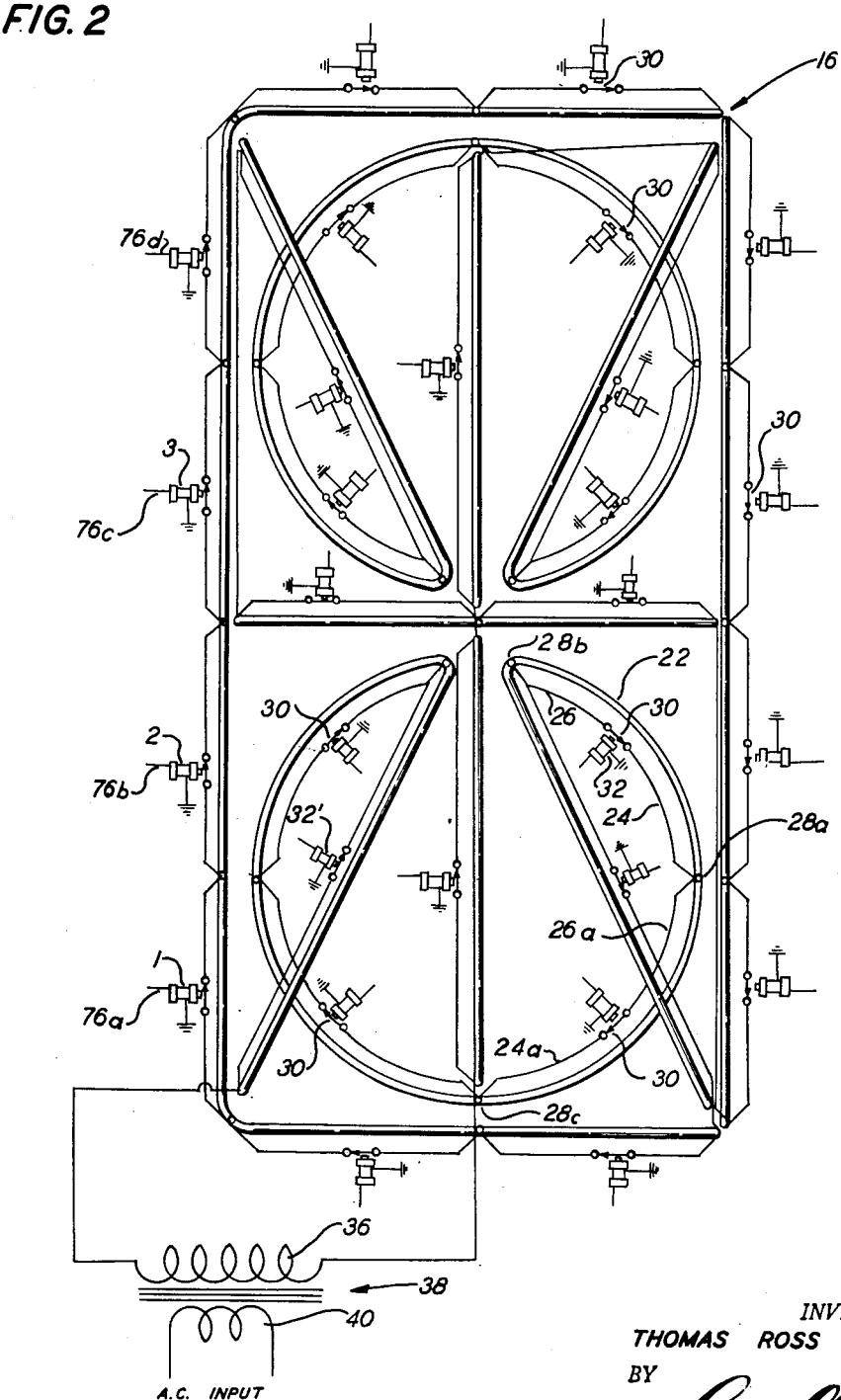
Fig. 2 is a plan view of a symbol former.

The symbols are formed on the transmitter 10 by the symbol formers 16 which are illustrated in their essential details in Fig. 2.

The symbol selectors by which the particular characters produced by the character formers 16 are preselected and shown on panel 12, are illustrated in detail by Figs. 3 through 18.

In general the symbol selector assembly is formed as a unit 20 to which there is fixedly attached a stack 92, Figs. 3 and 4, of dry-disc type electrical valves 70 of the type generally employed as alternating to direct current rectifiers. The assembly of unit 20 and stack 92 is readily removable from this control panel frame for replacement by an identical assembly without moving of any other assembly whenever elements of the assembly become defective in use.

For example, with the construction as shown, only one permanently attached wire needs to be disconnected from the assembly 20 in order to completely sever its mechanical connection with the balance of the panel, and this can be done at the front of the panel after the assembly 20 has been pulled out of its position as a component of the panel.

Figure 9:
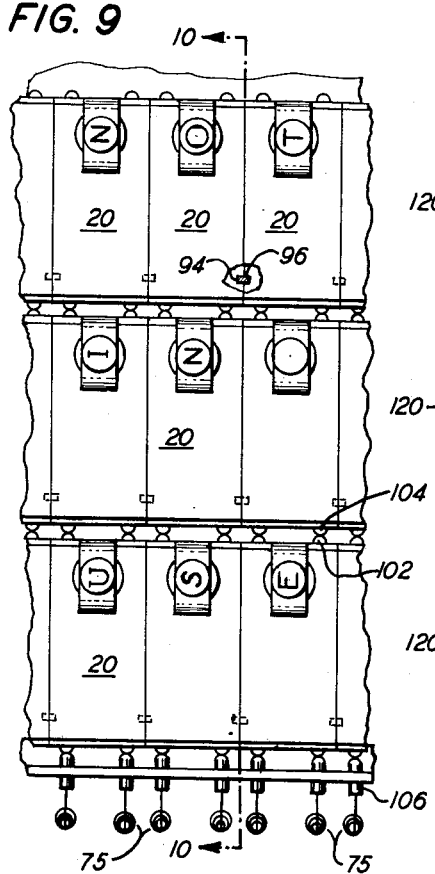
Fig. 9 is an enlarged front elevational view of a fragment of the program panel and illustrates a detail of mounting of units to form a signaling program control panel.

As assembled to form the control panel the units 20 are positioned in side by side and relatively stacked relation as shown in Fig. 9, each unit having lateral grooves 94 formed therein to receive the rails 96 carried by a suitable relatively fixed frame 98 (Fig. 10) disposed behind the face of the panel and providing stops 100 against which units 20 engage when in panel forming position. As will more fully appear, when in panel forming position, the respective vertical rows of units make up the total of the connections in the panel to common conductors 76a, 76b, etc. (Fig. 10) for the particular character former 16 to which these units relate and are connected. These connections are made by brush connectors 102 and 104 which come into correct registration when the units 20 are fully seated against stops 100.

Figure 10:
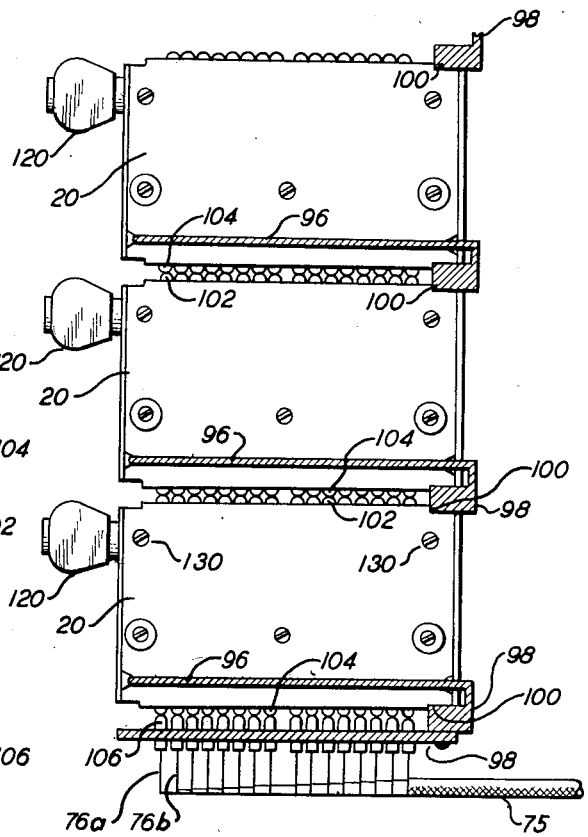
Fig. 10 is a sectional elevation as from line 10—10 of Fig. 9.
Figure 11:
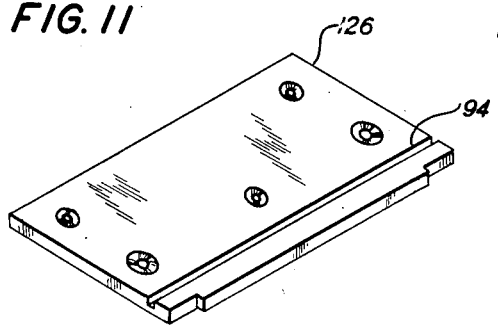
Fig. 11 is an isometric view of a detail of the unit 20.
Figure 12:
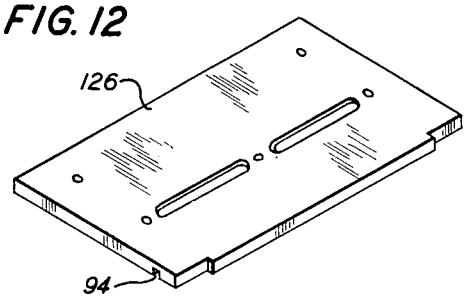
Fig. 12 is a similar view of the inside of the plate of Fig. 11.

A distinct set of terminals 106 permanently mounted on a portion of frame 98 are positioned for engagement by the bottom-most unit 20 of each vertical row as illustrated in Fig. 10, which sets of terminals are connected through the cables (see also Fig. 1) including the individual conductors 76a, 76b, etc., with relays 1—29 of sign symbol former elements 16 (Fig. 2). The symbol selector units 20 will now be generally described.

Each panel forming symbol selector unit 20 includes a group of connectors 108 (see Figs. 5 and 6) corresponding to the number of switches 30 and electromagnetic relays 32 controlling a character former 16. Each connector 108 includes an actuatable contact 110 and a companion contact 112 electrically permanently connected by a securing pin 114 to a conductive brush assembly comprising a brush 104 fixed in the unit body and a plunger brush 102 slidably mounted in the body in alignment with brush 104 and projected outwardly by an expansion coil spring 116. A bronze ribbon 118 is secured to the juxtaposed brush ends to limit outward movement of brush 102 and to provide insured electrical conductivity between the brushes 102 and 104 of the assembly.

The various connectors 108 are selectively operable so that any combination of simultaneously closed or opened switches 30 of a symbol 16 may be effected. In order to occupy a minimum of space the connectors 108 of a unit 20 are conditioned in any concurrently required combination of open and closed positions by connection combination selectors 120 which are separable from the unit and only one selector 120 is present in the unit 20 when in effective operation. The connection selector 120 (Fig. 8) is provided with a plurality of cam lobes 122 by which the actuatable contacts 110 are actuated simultaneously and held in closed position. The selector 120 is preferably formed of a material readily worked by a hand file, such as Bakelite molded to provide a circuit combination connector selector and actuator blank 20', as illustrated in Fig. 7, having sufficient number of cam lobes 122 to actuate all of the contacts 110 in a group. By means of a suitable hand file all the cam lobes 122 desired not to operate corresponding contacts 110, are removed. The remaining lobes 122 serve to effect closure of the contacts 110 with 112 of a unit to provide for the formation of a particular symbol or letter at the character formers 16 controlled thereby. Each selector 120 is provided with a character identification receiving area 124 having the character designation thereon so positioned that when the selector 120 is operatively applied to unit 20, it appears readable in erect position to one standing in front of the control panel. By this means, the words or characters displayed by the sign appear in their correct order at the control panel.

As shown, the selector unit 20 is generally block-shaped and formed by side plates 126 and 128 (Figs. 4, 5 and 6) of insulation and secured as by screws 130 to a pair of depending lugs 132 of a bridging top plate 134, which is also of insulation.

A support 138, which is most clearly illustrated in Figs. 13 and 14, is provided for the connector contacts 112 and for the brush assemblies including brushes 102 and 104. The support 138 is formed of insulating material and is generally a rectangular plate in appearance, having flat parallel surface faces 138a and 138b. The face 138a is formed with a series of identical parallel channels 140 extending between a top edge 138c and a bottom edge 138d of the plate 138. The plate is further provided on its face 138b, with a horizontally coextensive and raised supporting ridge 138e, having vertically disposed transverse grooves 146 in parallel position with the channels 140.

The contacts 112 (Figs. 5 and 14) are mounted on spring blades 113. The blades 113 are positioned in the grooves 146, and the brush assemblies are fastened in channels 140 by rivets 114 as shown in Figs. 5 and 6.

A unit sub-assembly of the movable contacts 115 (Figs. 5, 6 and 16) is provided and comprises a rectangular plate 148 of insulating material having parallel faces providing parallel vertically disposed and juxtaposed grooves 148a in both faces thereof, providing for the reception therein of the paired spring blades 110 carrying contacts 115. Rivets 158 extend through opposed blades 110 and the intervening web 148b of plate 148 to secure the blades 110 to the plate near the lower edges thereof.

The lower ends of paired blades 110 are welded together as at 110a, and one blade is extended for connection to a circuit wire at 68'. The paired blades 110 are integrated at 110a prior to assembly with plate 148 and are easily slid into the companion grooves 148a in the opposite faces of the plate. Consecutive extensions 68 are caused to project leftward and rightward to permit conductor approach from both sides of the plate 148 as shown in Figs. 5 and 6.

Plates 126, 128 and 138 are provided with registering frame stop receiving notches 100a, and the top plate 134 is provided with a stop receiving notch 106.

A pair of spacer strips 160 (Figs. 13, 14 and 15) having grooves 162 longitudinally disposed in the faces thereof, is received against the plate 148 and ridges 137 of plates 138 to hold the lower ends of the contacts in rigid position as shown.

The top plate 134 is provided with parallel rows of passages 136 (Figs. 6 and 17) for the free movement therein of the brushes 102, and has formed integrally at the ends thereof pairs of depending lugs 134a, 134b, 134c and 134d, providing seats for the securement thereto of the side plates 126 and 128. The pairs of lugs provide inwardly facing surfaces 134e for the reception therebetween of the upper corner portions of plate 148. Lugs 134c and 134d together form a cylindrical bearing 134f of a diameter to journal therein the end 125 on selector 120. Lugs 134a and 134b together form a cylindrical bearing for the portion 135 of selector 120, and further provide an annular seat 134g at the forward side of the lugs.

A washer 139 (Fig. 18) is provided of a diameter for rotatable mounting on seat 134g. Washer 139 is provided with an arcuate notch 141 terminated by radial shoulders 143 spaced a little over ninety degrees apart. A stop 143a (Fig. 17) is secured in the lug 134a and provides stoppage for washer 139 upon rotation 90 degrees in either direction.

Washer 139 has punched centrally therethrough a connection selector passage 145 having a cross-section to fit the cross-section of selector 120 as seen in Fig. 7. Correct orientation of the connection selector with the connectors is insured by providing the selector 120 with a longitudinal groove 120a in one side only thereof, and providing an aligning lug 147 on washer 139 so that the selector 120 cannot be inverted with respect to the connector arms 110.

The washer 139 is held in position by a face plate 20a secured to unit 20, which plate is provided with a round hole in registry with opening 145.

The connector contact arms 110 are bent outwardly from the plane of plate 148 (Figs. 5, 6 and 16) to provide a widened passage for the selector 120 therebetween, which is, after assembly, in registry with the axis of bearings 134f (Fig. 17). If the blank 120' (Fig. 7) were fully inserted in the unit 20 and rotated, all arms 110 would be actuated by reason of the engagements of the respective lobes 122 with all arms 110. By omitting preselected lobes 122 as in the connector selector 120, only certain connectors are actuated to closed position.

It is necessary to insure that the selector 120 be inserted only with the flat sides vertical. To this end a channel member 170 of metal is fastened to the top plate 134 with the channel walls depending so as to lie alongside of the selector when inserted. The upper wall of the channel as shown in Fig. 17, is provided with notches 173 separated by lugs 172. The notches are in registry with the uppermost lobes 122 of selector 120 when it has been fully inserted, and permit passage of the top lobes by a counter-clockwise rotation of the selector. A clockwise rotation is prevented by the continuous wall 170. The selector must be fully inserted before it can be rotated because the portions 125 of the selector and channel wall prevent rotation at any other position of the selector. Notches 138f are provided in plates 138 for clearing lugs 134a, 134b, 134c and 134d in the assembly.

By Figs. 5 and 6 it is evident that a conductor channel or gutter 166 is formed by the construction previously decribed, into which the connector ends 68 extend, and into which the conductors 12a extend. A rear closure plate 20b is provided, and cut away to form a notch 20c in registry with channel 166.

A stack 91 of dry disc valves 92 (Figs. 3 and 4) of the copper oxide or selenium disc type, is secured to the plate 20b by a mounting bracket 92b, and the conductors 12a, 12b therefore extend between points on relatively fixed elements. The diameter of the stack is less than the breadth of the unit 20 so that the entire unit can be drawn to the front of the panel. The connector combination actuating selector 120 has positioned on the visible area 124 thereof a character or symbol, such as a letter or a number, corresponding with that to appear on transmitter 10. The letter A is shown in Fig. 3a to appear on its side. This position indicates the connector contacts have not been closed. When operated to close the contacts to prepare for formation of the letter A, the mark A appears erect. Accordingly, when, as illustrated in Fig. 1, all required connections have been made, the selector operators 120 show the message being effected at transmitter 10.

When it is desired to do so, any unit 20 is pulled forward, Fig 9, or to the left, as viewed in Fig. 10. This brings out all the valves 92 as well as the unit. Only one conductor need be disconnected from each unit. Therefore, in the event of damage to connector unit or valve stack, a replacement of the entire assembly is a matter of but a few seconds' work.

By reference to Fig. 1 it will be observed that only one conductor extends from each of contacts 74a, 74b, etc., to the horizontal rows 18a, 18b, etc. of connector groups in the control panel. As shown in Fig. 4, the conductor 12a is connected to one pole of each valve 92 in the top horizontal row of symbol selector valve groups. The other pole of each in valve 92 in each selector unit, is, as previously described, connected to an individual terminal 68' (Fig. 18).

I claim:

1. Multiple circuit connector apparatus comprising, in combination: series of pairs of contacts in rows; a generally flat actuator for insertion between the rows having cam lobes along its edges, means for positioning the actuator for rotation to cause the lobes to engage with and actuate connector pairs; and means for preventing rotation of said actuator except in one position of insertion.

2. In electrical control mechanism: a plurality of receptacles; a plurality of selector switches in each receptacle; a plurality of connectors having end portions extending from opposite sides of each receptacle, the connectors extending from one side being paired with the connectors on the opposite side and at least one of each pair of connectors being movable inwardly of the receptacle; and spring means yieldingly urging the movable connectors outwardly; the receptacles being adapted for positioning in mounting means and when thus positioned the respective pairs of connectors of each receptacle are in contacting alignment.

3. In electrical control means: a receptacle; a plurality of switches in said receptacle; a plurality of pairs of connectors having their ends extending outwardly of the receptacle on opposite sides thereof, one of each connector in a pair being movable inwardly relative to said receptacle; and yielding means urging the movable connector in the opposite direction.

4. In a selector unit for an electrical system: a receptacle having an opening therein for reception of an elongated selector element; a disc operably receivable in said opening for rotation therein, said disc having a passage for reception of the selector element and means so that selector element can be inserted therein in but one way, and an arcuate peripheral notch having shoulders at each end thereof; means cooperable with said notch whereby said disc is limited in its rotative movements; and a plurality of switches within the receptacle selectively operable by the selector element.

5. The invention defined by claim 4, wherein there is a longitudinally extending channel member within the receptacle so arranged that one edge of the selector element is receivable therein, one wall of said channel member being provided with a plurality of spaced notches separated by lugs, said notches and lugs corresponding respectively to cams and spaces between said cams on the selector element.

THOMAS ROSS WELCH.

REFERENCES CITED

The following references are of record in the file of this patent:

UNITED STATES PATENTS

| Number | Name | Date |
|---|---|---|
| 1,041,174 | Saalfeld | Oct. 15, 1912 |
| 1,346,493 | Hammond et al. | July 13, 1920 |
| 1,965,122 | Kardorff | July 3, 1934 |
| 2,063,830 | Rouse | Dec. 8, 1936 |
| 2,376,846 | Field et al. | May 22, 1945 |
| 2,398,019 | Mackenzie | Apr. 9, 1946 |

FOREIGN PATENTS

| Number | Country | Date |
|---|---|---|
| 10,333 | Great Britain | June 11, 1898 |